United States Patent
Firooz et al.

(10) Patent No.: US 10,762,083 B2
(45) Date of Patent: Sep. 1, 2020

(54) ENTITY- AND STRING-BASED SEARCH USING A DYNAMIC KNOWLEDGE GRAPH

(71) Applicant: Microsoft Technology Licensing, LLC, Redmond, WA (US)

(72) Inventors: Hamed Firooz, Fremont, CA (US); Lin Guo, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 15/849,723

(22) Filed: Dec. 21, 2017

(65) Prior Publication Data
US 2019/0197158 A1 Jun. 27, 2019

(51) Int. Cl.
*G06F 16/2453* (2019.01)
*G06N 20/00* (2019.01)
*G06F 16/31* (2019.01)
*G06F 16/901* (2019.01)

(52) U.S. Cl.
CPC ...... *G06F 16/24534* (2019.01); *G06F 16/313* (2019.01); *G06F 16/9024* (2019.01); *G06N 20/00* (2019.01)

(58) Field of Classification Search
CPC ............. G06F 16/24534; G06F 16/635; G06F 16/637; G06F 16/24573; G06F 16/313; G06F 16/81
See application file for complete search history.

(56) References Cited

U.S. PATENT DOCUMENTS

| | | | | |
|---|---|---|---|---|
| 6,029,165 A | * | 2/2000 | Gable | G06F 40/242 |
| 2008/0114739 A1 | * | 5/2008 | Hayes | G06F 16/951 |
| 2010/0256969 A1 | * | 10/2010 | Li | G06K 9/6296 703/16 |
| 2011/0184893 A1 | * | 7/2011 | Paparizos | G06F 16/24522 706/12 |
| 2011/0314006 A1 | * | 12/2011 | Sweeney | G06F 16/367 707/723 |
| 2012/0096042 A1 | * | 4/2012 | Brockett | G06F 16/24534 707/798 |
| 2012/0158703 A1 | * | 6/2012 | Li | G06F 16/3349 707/723 |
| 2014/0337357 A1 | * | 11/2014 | Gattiker | G06F 16/245 707/748 |
| 2016/0063115 A1 | * | 3/2016 | Ayan | G06Q 50/01 707/722 |
| 2016/0110341 A1 | * | 4/2016 | Chuang | G06F 40/242 704/8 |

* cited by examiner

Primary Examiner — David T. Brooks
(74) Attorney, Agent, or Firm — Schwegman Lundberg & Woessner, P.A.

(57) ABSTRACT

Techniques for performing a database search using a rewritten and annotated query are disclosed herein. In example embodiments, a profile lexicon is generated from a set of raw user profiles. A click-through lexicon is generated from a raw query log. A machine-learning model is trained for entity prediction using selected data. Query tagger data is generated using the profile lexicon, the click-through lexicon, and the machine-learning model. A raw query is received. The raw query is rewritten as an annotated query based on the generated query tagger data. A search of a database is performed using the annotated query. Results of the search are returned in response to the receiving of the raw query for presentation in a user interface.

17 Claims, 7 Drawing Sheets

ENTITY- AND STRING-BASED SEARCH USING A DYNAMIC KNOWLEDGE GRAPH

TECHNICAL FIELD

The present application relates generally to improved searching algorithms and user interfaces and, in one specific example, to methods and systems of using a combination of a dynamic knowledge graph, entity-based searching algorithms, and string-based searching algorithms to improve relevance of search results.

BACKGROUND

A social-networking system, such as LinkedIn, may benefit from improving the degree to which search results match search queries, such as search queries for people, job openings, companies, and so on. Additionally, the social-networking system may benefit from the usefulness or distinctiveness of user interfaces in which search results are presented to a user of the social-networking system.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Example methods and systems of enhancing usability and electronic resource efficiency using job relevance are disclosed. In the following description, for purposes of explanation, numerous specific details are set forth in order to provide a thorough understanding of example embodiments. It will be evident, however, to one skilled in the art that the present embodiments may be practiced without these specific details.

Users of a social network (e.g., LinkedIn) may present themselves as a set of entities, including skills, titles, companies, geo locations, schools, degrees, and so on. For example, a member profile may include the member's professional experiences and skillset, all described using these entities.

When users do either navigational or discovery searches on a professional network, they also make queries based on entities. For example, a user can make a query like "Machine learning engineer Linkedin." This query may be matched to member profiles using exact or partial matches between the query and entities included in the member profiles. However, this approach may lack accuracy for a variety of reasons. First, members may use different but similar entities to describe the same concept. For example, members working in the Information Technology (IT) industry with focus on software programming may use different titles to describe themselves, such as "software engineer," "software developer," "hacker," "programmer," and so on. Second, although users make queries in one language, in a social network they may be interested in seeing related results from other languages. For example, users in California who make query about "plumber" may be interested in seeing members with title "fontanero." Third, different types of entities are not independent: when users create a query like "software engineer" in a professional network. For example, users are not looking just for someone who has put "software engineer" as their title. They want to find members who actually know about software engineering. That means skills and degrees and field of study are also important for the searcher.

In an entity-aware search, the above technical issues are solved by integrating entity taxonomies (e.g., a dynamic knowledge graph) as part of a search engine. These taxonomies may be generated by performing data mining on a large set of member profiles (e.g., millions of member profiles on one or more professional networks, such as LinkedIn). In example embodiments, the taxonomies may be initially curated by taxonomy experts, providing a clean and structured ontology about professionals on the network. Machine-learning techniques may then be used to generate query tagger data according to a machine-learned model, which may then be applied to a raw query to generate an annotated query. The annotated query may then be substituted for the raw query to produce an enhanced search result to the user via a user interface.

The entity taxonomies may contain various forms of metadata or meta information that can be used. For example, the entity taxonomies may contain translations of entities in one or more other languages; relations between entities in a same taxonomy area, such as "software engineer" and "software developer" are the same or "software engineer," "machine learning engineer," and "data scientist" are similar; relations between different types of entities: for example, "software engineer" has close relation to certain types of skills. such as programming, algorithm, or data structure skills.

In example embodiments, the entity taxonomies may grow and evolve based on a machine-learning model as member profiles are added or modified. Thus, for example, as new tokens or n-grams are discovered within user profiles and queries, they may be mapped to particular entities and standardized for use in annotated queries.

Techniques for performing a database search using a rewritten and annotate query are disclosed herein. In example embodiments, a profile lexicon is generated from a set of raw user profiles. A click-through lexicon is generated from a raw query log. A machine-learning model is trained for entity prediction using selected data. Query tagger data is generated using the profile lexicon, the click-through lexicon, and the machine-learning model. A raw query is received. The raw query is rewritten as an annotated query based on the generated query tagger data. A search of a database is performed using the annotated query. Results of the search are returned in response to the receiving of the raw query for presentation in a user interface.

In example embodiments, one or more modules are incorporated into a social networking system, the one or more modules specially-configuring (e.g., through computer programming logic) one or more computer processors of the social networking system to perform one or more of the operations described herein.

Figure 1:
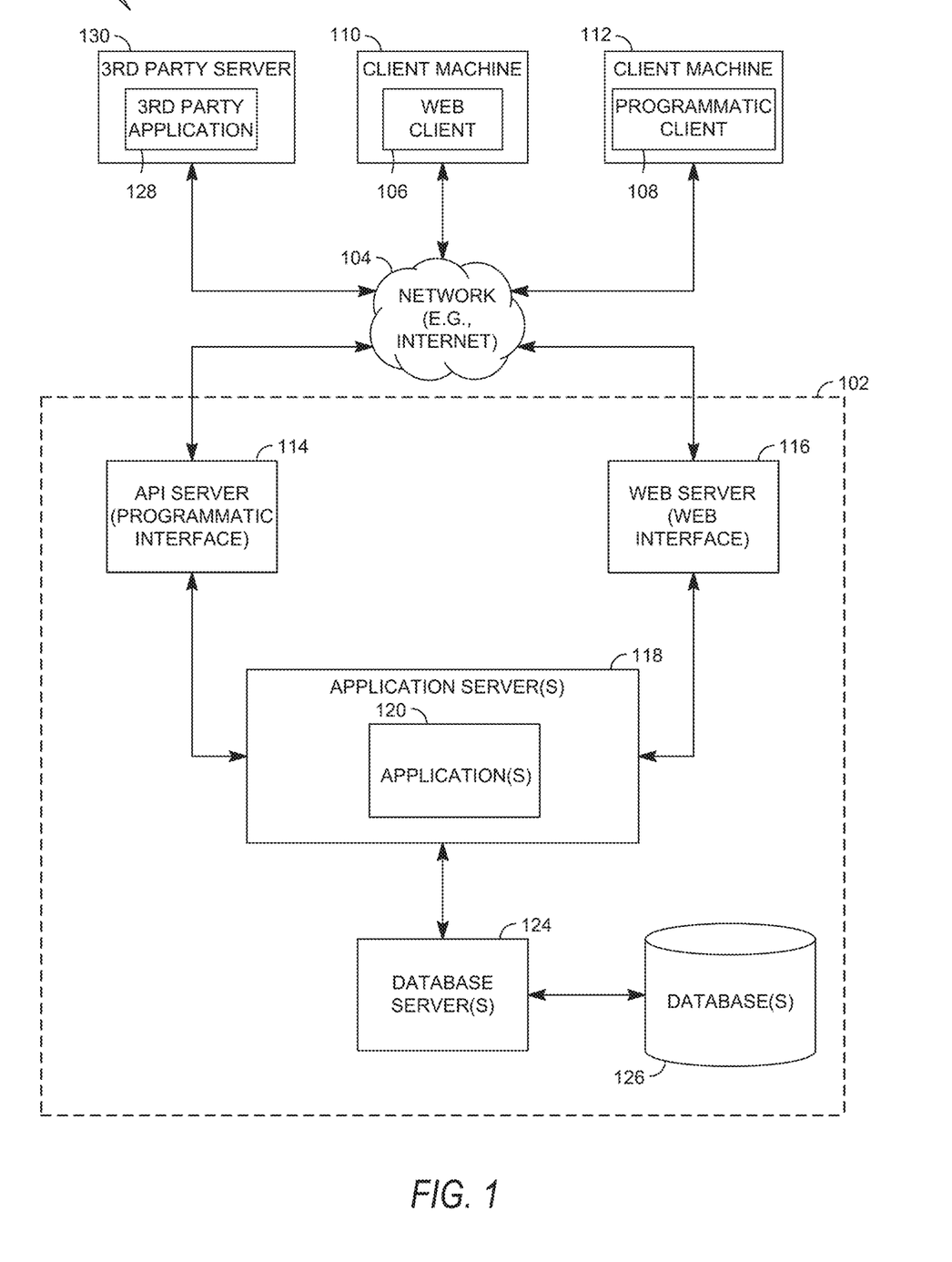
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device. In some embodiments, the networked system 102 may comprise functional components of a social networking service.

Figure 2:
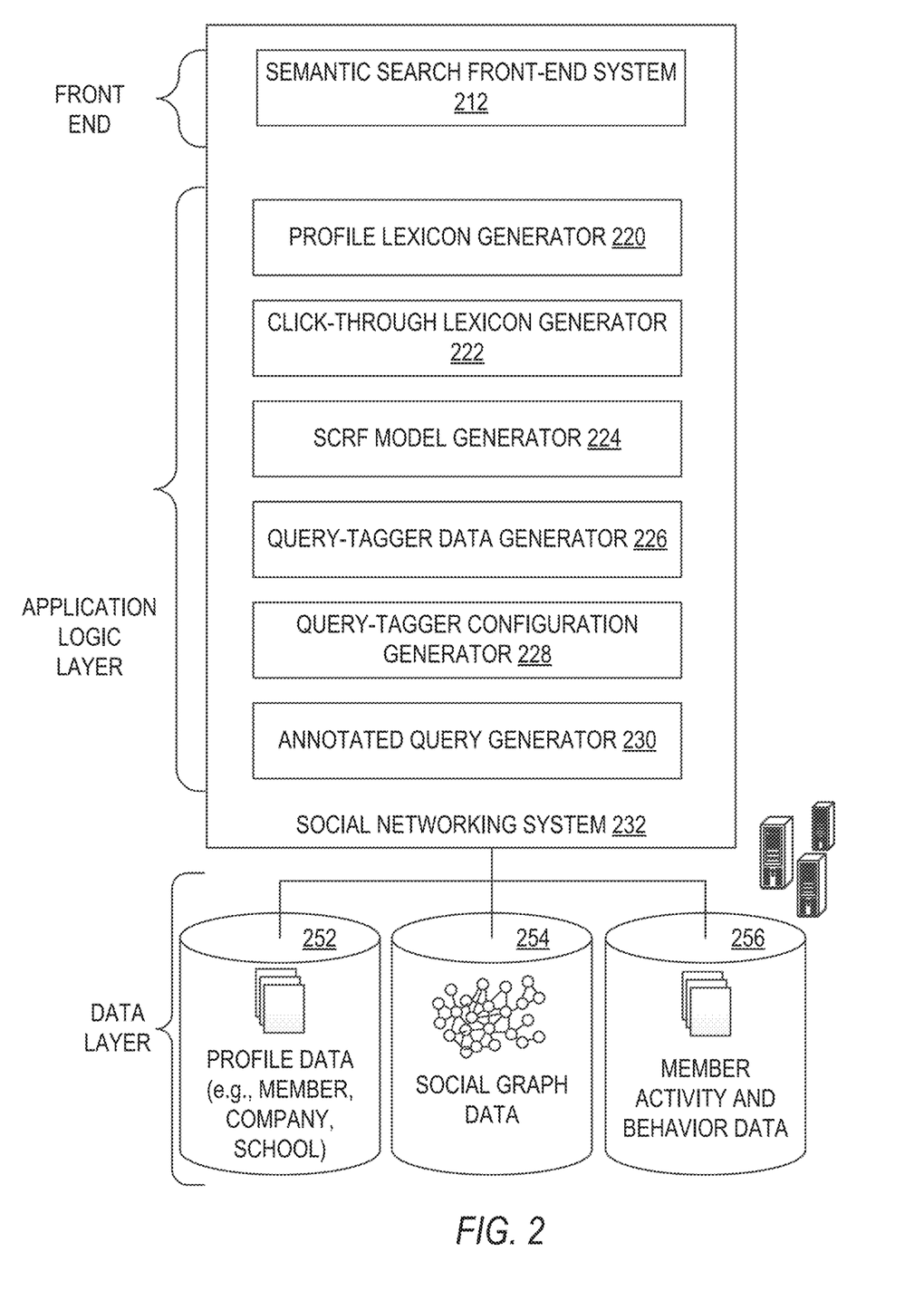
FIG. 2 is a block diagram showing the functional components of a social networking service within a networked system, in accordance with an example embodiment.

As shown in FIG. 2, front-end components, including a semantic search front-end system 212, may comprise a user interface module (e.g., a web server), which receives requests from various client-computing devices, and communicates appropriate responses to the requesting client devices. For example, the user interface module(s) may receive requests in the form of Hypertext Transfer Protocol (HTTP) requests, or other web-based, application programming interface (API) requests. Upon detecting a particular interaction, the front-end components may log the interaction, including the type of interaction and any meta-data relating to the interaction, in a member activity and behavior database 256.

An application logic layer may include one or more various application server modules, which, in conjunction with the user interface module(s), generate various user interfaces (e.g., web pages) with data retrieved from various data sources in the data layer. With some embodiments, application server modules are used to implement the functionality associated with various applications and/or services provided by the social networking service. In some example embodiments, the application logic layer includes execution of high-level scripting applications (e.g., Pig/Hadoop applications), execution of batch jobs (e.g., Azkaban jobs), and so on. In example embodiments, the application logic layer includes profile lexicon generator 220, a click-through lexicon generator 222, an SCRF model generator 224, a query-tagger data generator 225, a query-tagger configuration generator 228, and an annotated query generator 230, each of which is described in more detail below.

As shown in FIG. 2, a data layer may include several databases, such as a database 252 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 252. Similarly, when a representative of an organization initially registers the organization with the social networking service, the representative may be prompted to provide certain information about the organization. This information may be stored, for example, in the database 252, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 254.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 256. This logged activity information may then be used by the Top Jobs system 220.

In some embodiments, databases 252, 254, and 256 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. For example, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the front-end and back-end systems are referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
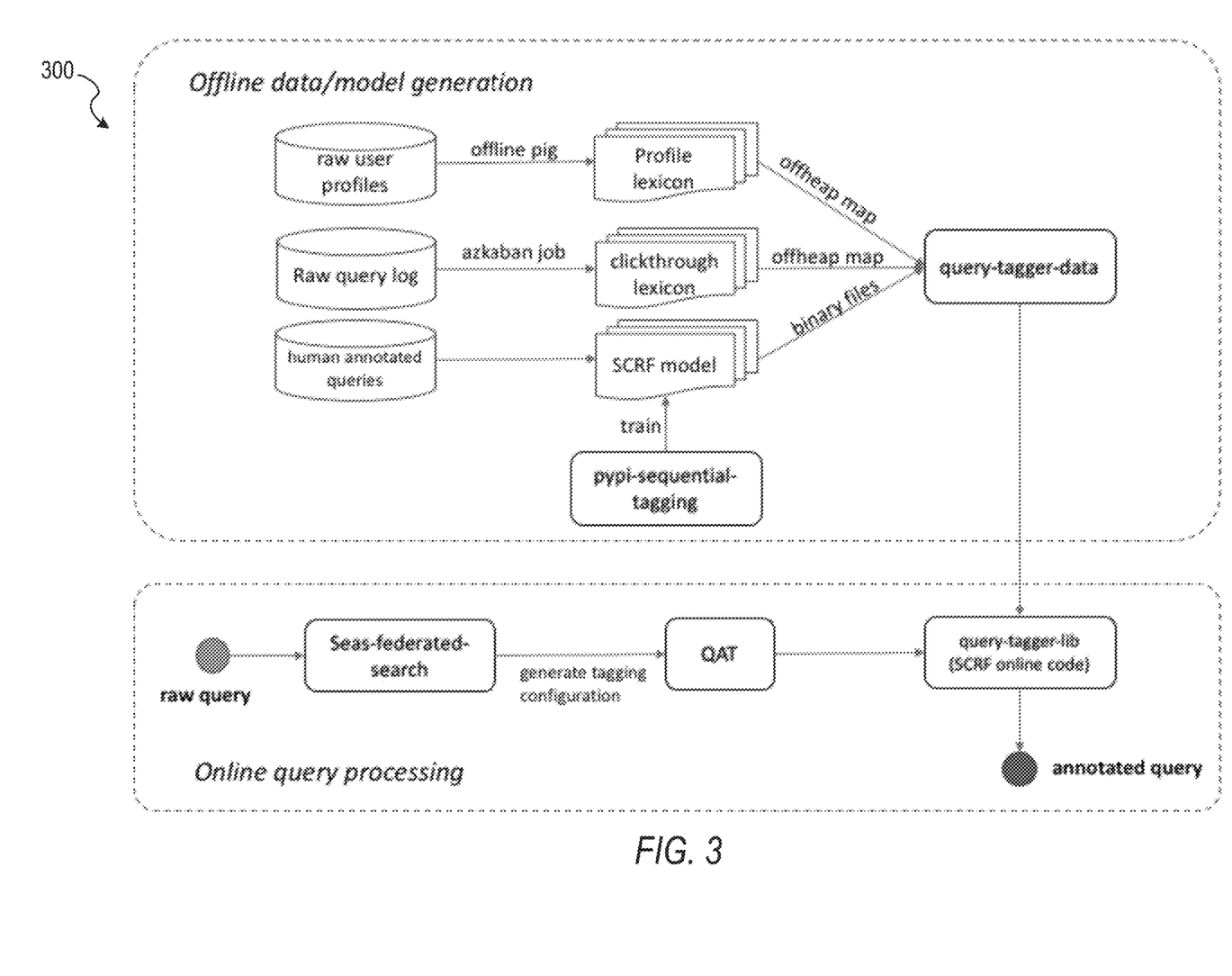
FIG. 3 is a block diagram illustrating offline data/model generation and online query processing that is performed one or more modules of the social networking system.

FIG. 3 is a block diagram illustrating offline data/model generation and online query processing that is performed one or more modules of the social networking system 232. In example embodiments, databases containing raw user profiles, raw query logs, and human-annotated queries are included in the data layer of the social networking system 232. From the raw user profiles, a profile lexicon is generated (e.g., by the profile lexicon generator 220). The profile lexicon includes statistics of an n-gram regarding a set of tags that may be assigned to the query. In example embodiments, the set of tags may include one or more of company name (CN), first name (FN), last name (LN), geolocation (GEO), school name (SN), skill (SK), or title (T). In example embodiments, an unknown tag (O) may be inferred if a token included in the query does not belong to any of the set of tags. For example, if "pinterest" appears 1000 times in the skill fields of the raw user profiles and 500 times in company fields of the raw user profiles, then the profile lexicon indicates that there is a 66.66% probability of "pinterest" being a company and a 33.33% probably of "pinterest" being a skill.

From the raw query log, a click-through lexicon is generated (e.g., by the click-through lexicon generator 222). The click-through lexicon includes click-through data pertaining to search results that are clicked by users. For example, for raw queries containing the word "pinterest," the click-through lexicon provides a probability that "pinterest" is one of the set of tags based on click-through data pertaining to the search results. For example, the click-through lexicon may indicate that it is more likely that "pinterest" is a company than a skill based on users clicking search results for "pinterest" that correspond to user profiles in which "pinterest" is included in the companies specified in the user profiles rather than skills specified in the user profiles.

A semi-conditional random field (SCRF) model is generated (e.g., by the SCRF model generator 224). The model may then be initially created from human annotated queries and trained using any combination of one or more of human annotated queries, profile lexicon data, or click-through lexicon data, as described in more detail below.

Query tagger data is generated based on the profile lexicon, the click-through lexicon, and the SCRF model (e.g., by the query tagger data generator 228). In example embodiments, the one or more modules used for generating the query tagger data are offline modules. Later, during online query processing, the SCRF model may be applied to the generated query tagger data and tagging configuration (e.g., using SCRF online code), as described in more detail below.

In example embodiments, the online query processing includes receiving a raw query (e.g., via a search engine), generating a tagging configuration (e.g., QAT), and using the query tagging configuration and query tagger data to generate an annotated query. As an example, the query "linkedin software engineer jog sunnyvale" may be tagged as CN: (linkedin), T: (software engineer), O: (job), GEO (sunnyvale). The annotated query may then be used instead of the raw query to produce an improved search result, as described in more detail below.

Figure 4:
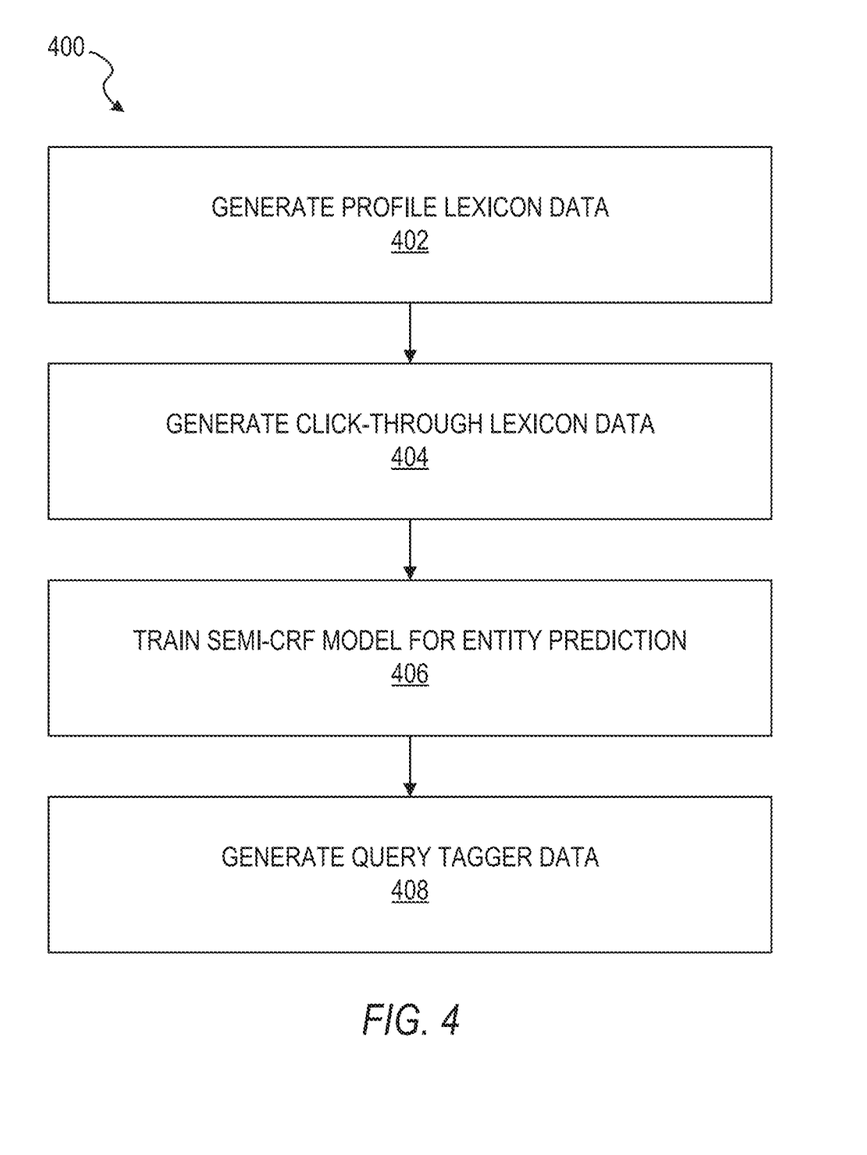
FIG. 4 is an example method of generating query tagger data.

FIG. 4 is an example method 400 of generating query tagger data. In example embodiments, the operations are performed by one or more modules of the application logic layer of the social networking system 232.

At operation 302, profile lexicon data is generated (e.g., by the profile lexicon generator 220) for each of a set of n-grams in a query. In example embodiments, the profile lexicon data includes a lexicon feature that is directly computed from raw user profile data. The profile lexicon data is derived from raw user profiles to compute a probability that each n-gram is associated with a particular one of a set of candidate tags for the n-gram. For example, the profile lexicon data may indicate the probabilities that each n-gram is associated with the company (CN), first name (FN), last name (LN), geolocation (GEO), school name (SN), skill (SK), or title (T) candidate tags based on a distribution of the n-gram across various fields of the raw user profiles, such as the percentage of times the n-gram appears in the first name, last name, title, current company name, past company name, education, skills, employment, or location fields of the raw user profiles. In example embodiments, the profile lexicon data also includes a word- or token-level lexicon feature, which computes the conditional probability for each word (in addition each n-gram) in the query.

At operation 304, click-through lexicon data is generated (e.g., by the click-through lexicon generator 222). In example embodiments, the click-through lexicon data includes "query to user-profile" click-through data. For example, the click-through data may indicate a probability that each n-gram included in a query is associated with one of the set of candidate tags based on which fields the n-gram is most strongly associated with in user profiles that are clicked on by the user in search results presented to the user in response to the query. For example, the click-through lexicon data may indicate that a particular n-gram is more likely a company than a skill based on users having clicked on more user profiles in which the n-gram was included in a company-name field than on profiles in which the n-gram was included in a skill field.

At operation 306, a semi-CRF model for entity prediction is used to generate query-tagger data based on human-annotated queries, the profile lexicon, and the click-through lexicon. In example embodiments, the semi-CRF model solves shortcomings of logistical regression, Hidden Markov (HMM) models and CRF models because it operates at a segment level and can exploit non-linear progression features (or patterns), such as the profile lexicon and click-through lexicon, to more accurately predict a phrase in the query as being associated with a particular candidate tag. For example, consider the query "man on a mission project management jobs." The features of logistic regression may include an analysis of a previous word, the current word, and the next word in a corpus of words. For example, if there are 10,000 words in the corpus, then a 30,00-dimensional feature vector for each word in the query may be created. For example, for the word "management" included in the query, a vector indicating which of the 10,000 words in the corpus had "project" as a previous word, which of the 10,000 words had "management" as the current word, and which of the 10,000 words had "jobs" as the next word may be created. For each of the beginning and inside candidate tags, a score is computed based on the feature vector and the highest score is chosen. However, the logistic regression prediction does not model correlations between tags and thus does not account for whether a selected phrase mixes words that occur at the beginning or inside of the entities associated with the different candidate tags.

A CRF is able to model correlation between tags. For example, given a set of eight candidate tags and an unknown tag, the CRF includes a 15×15 matrix that contains scores for transiting from one tag to another tag. Here, the 15 tags include the Unknown tag and separate beginning and inside tags for each candidate tag, which denote scores pertaining to whether an n-gram is at the beginning of the candidate tag or included inside the candidate tag. The CRF assigns a score for two adjacent tags and finds a path with a maximum aggregated score; however, it does so only at the token level. Thus, CRF may not be able to identify that "man on a mission" is a company because the word "a" may be categorized as Unknown.

The Semi-CRF model, in contrast to the logistical regression, HMM, and CRF models, may make predictions at the segment level. For example, for each segment derived from the query, the semi-CRF model may create an n-dimensional vector indicating the score of a segment with respect to each of the set of candidate tags, where n is the number of the set of candidate tags. For example, for the query "man on a mission project management," the Semi-CRF generates scores for each of the following segments: "man," "on," "a," "mission," "project," "management," "man on," "on a," a mission," "mission project, "project management," "man on a," "on a mission," "a mission project," "mission project management," "man on a mission," "on a mission project," a mission project management," and so on. The Semi-CRF model than works on the segment level and finds a valid path to maximize the aggregated score. In this way, the Semi-CRF model may more easily incorporate segment-level features, such as profile lexicon and click-through lexicon features. Additionally, the Semi-CRF model may be based on evidence from a combination of character-level, token-level, and segment-level features. In example embodiments, character level features may include prefixes (e.g., "u") and suffixes (e.g., "er" or "ist"). Word level features may include the word itself, lemma, brown cluster, previous word/next work, bigram, and word embedding features.

In example embodiments, a latent representation learning pipeline has an input comprising a data structure having one or more of the following data items: a label data item (e.g., integer) indicated whether the result was clicked by the user), a result index (e.g., integer) containing a ranking of the search result presented to the user, skills (e.g., an array) indicating a list of skills associated with the result, positions (e.g., an array) indicating a list of companies, company sizes, titles, industries, and so on associated with the result, schools (e.g., an array) indicating a list of schools associated with the result, q_skills (e.g., an array) indicating a list of skills in the query, q_titles (e.g., an array) indicating a list of titles in the query, q_companies (e.g., an array) indicating a list of companies in the query, q_schools (e.g., an array) indicating a list of schools in the query, and q_regions (e.g., an array) indicating a list of regions in the query.

In example embodiments, training may be done only for exploratory queries (e.g., queries not including tokens that are most likely to be a first name or a last name).

At operation 308, query tagger data is generated (e.g., by the query-tagger generator 226).

For example, assume the goal is to create latent representation for the following entities: skill, title, and company. Let $f_e(i)$ be the latent representation of entity t of type e. For example $f_{skill}(9)$ is latent representation of the skill Id 9, which is a vector with 128 elements.

The following dot products are calculated between entities of the same type and across different types:

$$v_{e \to e'} = f_e(q) \cdot f_{s'}(d) \, e \in \{skill, title, company\} \, e' \in \{skill, current\ title, history\ title, fos\} \quad (1)$$

where $f_e(q)$ is the latent representation of entity e in query and $f_{e'}(d)$ is the latent representation of entity e' in document.

Using above dot product between entities in query and entities in document we can generate 12 features. These features are combined together using a linear model.

$$p = \Sigma v_{s \to s'} v_{e \to e'} \quad (2)$$

p is a single feature that is added to the search engine's linear model. $w_{e \to s'}$ is learned in an offline training model. These coefficients may then be loaded as a configuration file for online query processing.

Figure 5:
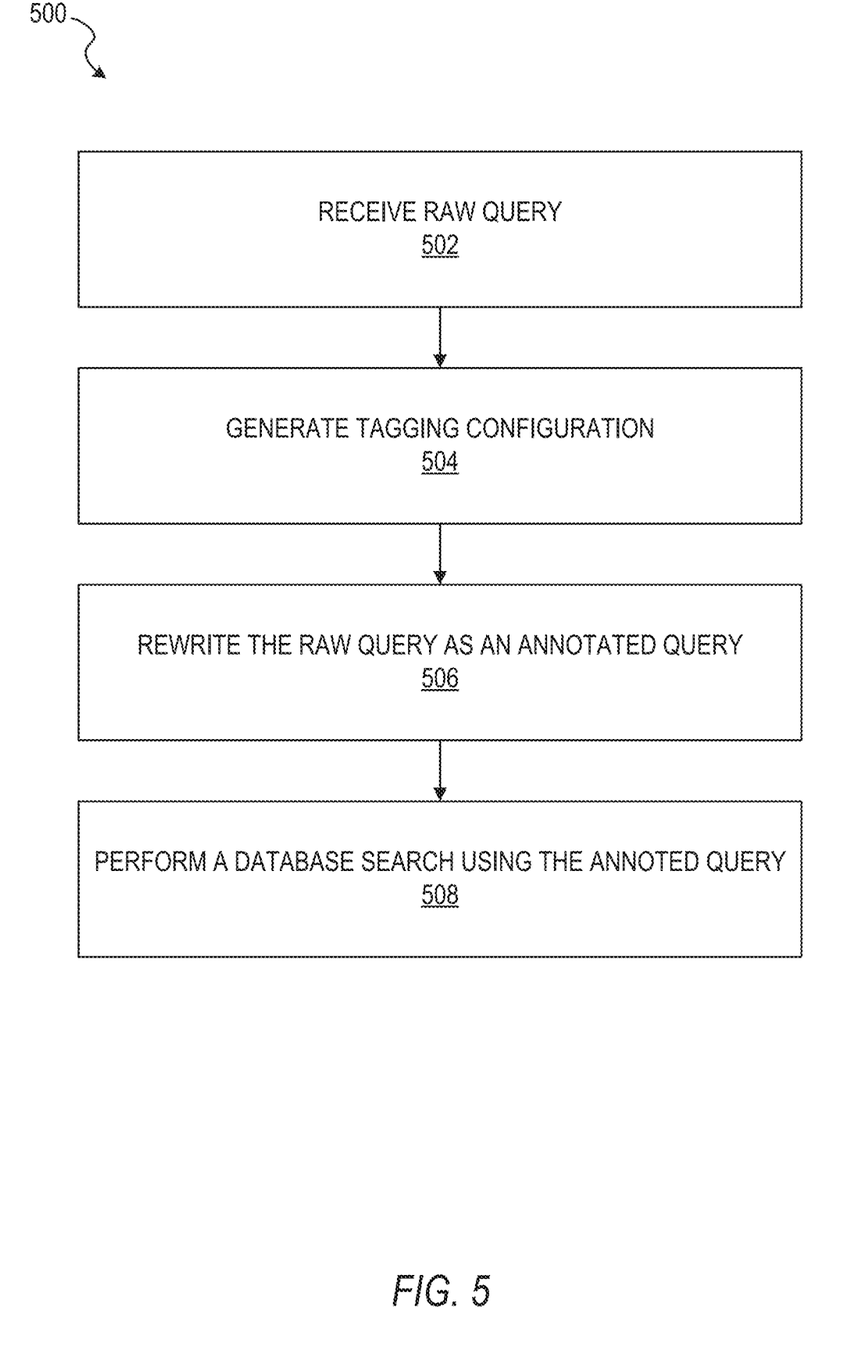
FIG. 5 is an example method of generating an annotated query based on the query tagger data.

FIG. 5 is an example method 500 of generating an annotated query based on the query tagger data. In example embodiments, the operations are performed by one or more modules of the social networking system 232.

At operation 502, a raw query is received (e.g., via. In example embodiments, the raw query may be generated by a browse action or a search action performed by a user of the social networking system.

At operation 504, a tagger configuration is generated (e.g., via the query-tagger configuration generator 228). The query-tagger configuration specifies configuration information, such as top n tagging, whether the query should use standardization, and whether to delete stop words.

At operation 508, an annotated query is generated (e.g., via the annotated query generator 230). Features are extracted and the Semi-CRF model is applied based on the query tagger data to get tagging results. In example embodiments, the n-grams or tokens included in the query are standardized based on a dynamic knowledge graph. The standardization includes identifying variations of each n-gram or token that correspond to a same entity (e.g., that "software programmer" corresponds to "software developer" or "it manager" corresponds to "information technology manager"). Additionally, the standardization includes mapping of n-grams and tokens to different languages and identifying and fixing typos. Thus, for example, all synonyms for a particular entity (e.g., job title) may be matched to a same identifier for purposes of tagging.

Consider the following query "michael dell." The query tagger data may indicate that there is a 99% probability that "michael" is a first name, a 51% probability that "dell" is a last name, and 47% chance that "dell" is a company name with a standardized identifier of 10933. Thus, the rewritten query may be as follows: "(fn:(Michael)[0.99] AND ln:(dell)[0.51]) OR fn:(michael)[0.99] AND cn:(dell)[id=1093, conf=0.47])." Now, consider that standardization returns two IDs for "dell," 1093 and 1093. The returned query would then be "(fn:(Michael)[0.99] AND ln:(dell)[0.51]) OR fn:(michael)[0.99] AND cn:(dell)[id=1093,conf=0.47], meta=[{id":1098,"score":0.84,"info":{ }}]])."

In example embodiments, the standardization id is included along with the query text for retrieval. For example, an example rewriting for the query "CEO" may be +(?T:ceo[720] ?T2:ceo[400] ?T3:ceo[160]) ?(title: 8). For "chief executive officer" an example rewriting may be +(?T:chief[720] ?T2:chief[400]?T3:chief[160])+(?T:executive[720] ?T2:executive[400] ?T3:executive[160])+(?T:officer[720] ?T2:officer[400] ?T3:officer[160]) ?(title: 8).

Example Mobile Device

Figure 6:
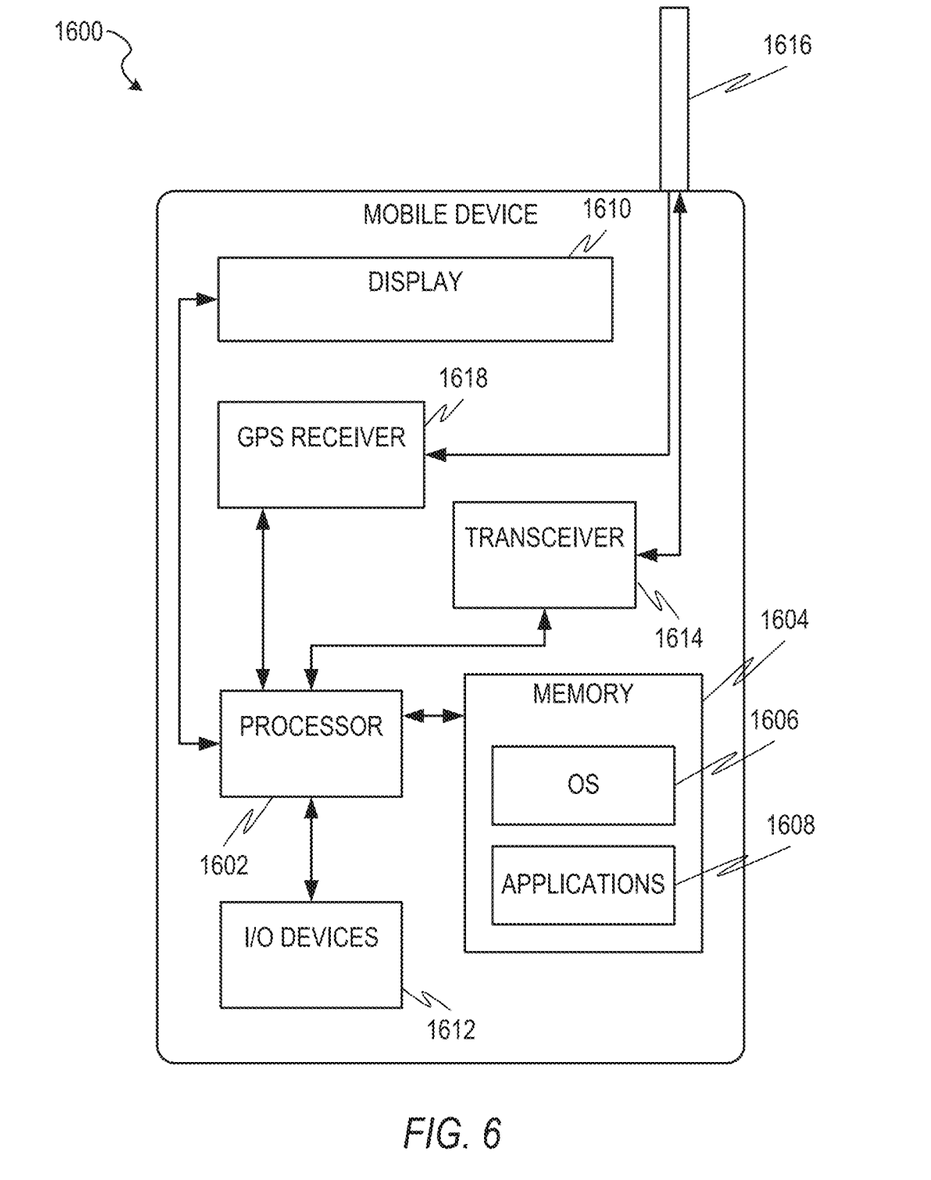
FIG. 6 is a block diagram illustrating a mobile device, in accordance with some example embodiments.

FIG. 6 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
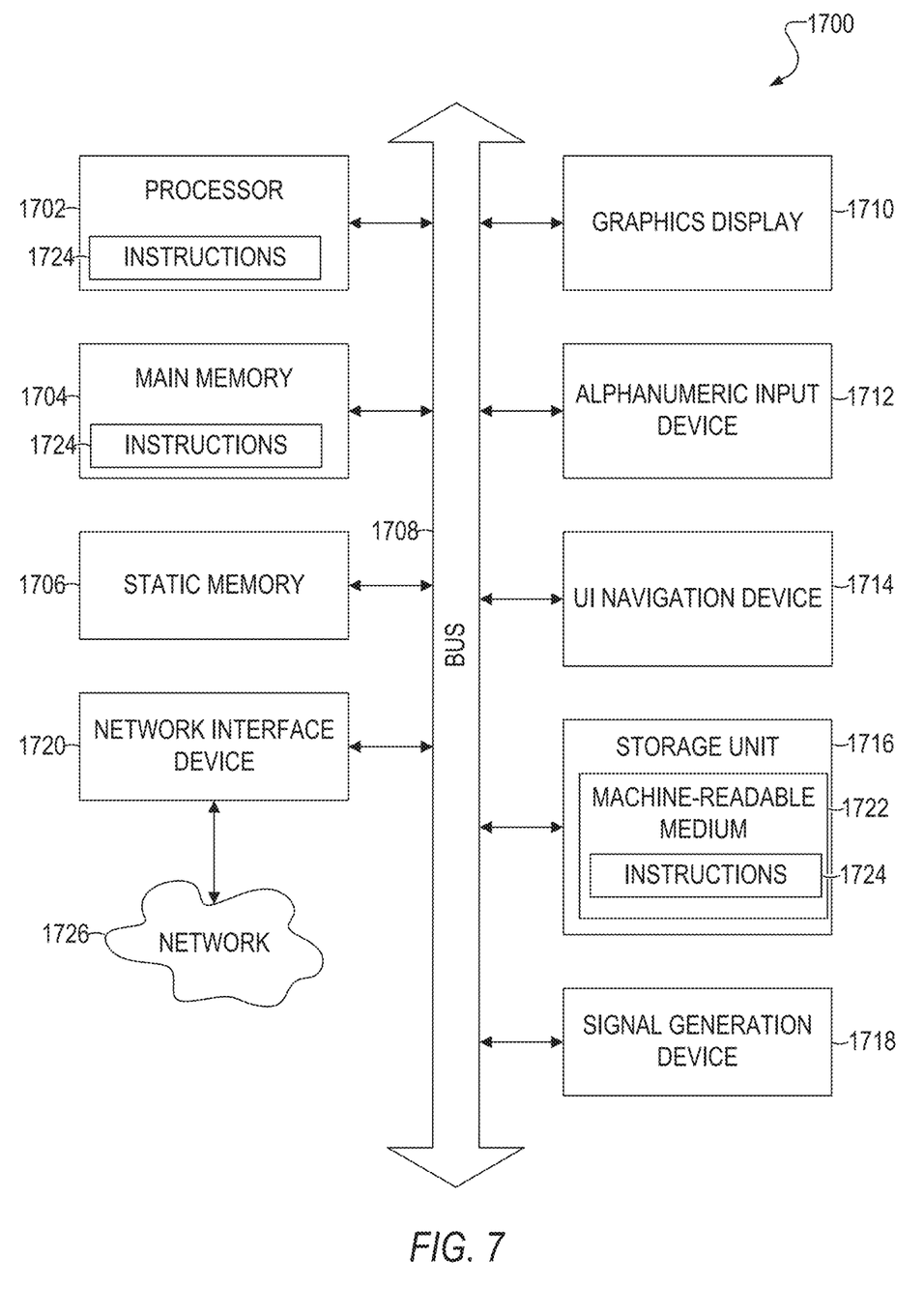
FIG. 7 is a block diagram of an example computer system on which methodologies described herein may be executed, in accordance with an example embodiment.

FIG. 7 is a block diagram of an example computer system 1700 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a graphics display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more computer processors;
one or more computer memories including computer executable instruction that when executed by the one or more computer processors cause the one or more computer processors to perform operations comprising:
generating a profile lexicon from a set of raw user profiles;
generating a click-through lexicon from a raw query log, wherein the generating of the click-through lexicon includes calculating a probability that an n-gram of the query corresponds to one of a set of candidate tags to be included in the annotated query, the probability based on a percentage of clicks by users of search results corresponding to user profiles in which the n-gram is specified in a field corresponding to the one of the set of candidate tags;
training a machine-learning model for entity prediction using selected data;
generating query tagger data using the profile lexicon, the click-through lexicon, and the machine-learning model;
receiving a raw query;
rewriting the raw query as an annotated query, the rewriting based on the generated query tagger data;
performing a search of a database using the annotated query;
returning results of the search in response to the receiving of the raw query for presentation in a user interface.

2. The system of claim 1, wherein the generating of the profile lexicon includes a calculating a probability that an n-gram of the query corresponds to one of a set of candidate tags based on a distribution of the n-gram across fields included in the raw user profiles, the fields being mapped to a set of entities corresponding to the set of candidate tags.

3. The system of claim 2, wherein the set of entities include at least two of company name, first name, last name, geolocation, school name, skill, or title.

4. The system of claim 1, wherein the rewriting of the raw query includes tagging each n-gram in the query with one of a set of candidate tags corresponding to a set of entities based on the query tagger data.

5. The system of claim 4, wherein the rewriting of the raw query includes specifying confidence levels associated with the set of candidate tags, the confidence levels based on the query tagging data.

6. The system of claim 1, wherein the machine-learning model is a semi-conditional random field model that operates at a segment level in addition to an n-gram or token level.

7. A method comprising:
generating a profile lexicon from a set of raw user profiles;
generating a click-through lexicon from a raw query log, wherein the generating of the click-through lexicon includes calculating a probability that an n-gram of the query corresponds to one of a set of candidate tags to be included in the annotated query, the probability based on a percentage of clicks by users of search results corresponding to user profiles in which the n-gram is specified in a field corresponding to the one of the set of candidate tags;
training a machine-learning model for entity prediction using selected data;
generating query tagger data using the profile lexicon, the click-through lexicon, and the machine-learning model;
receiving a raw query;

rewriting the raw query as an annotated query, the rewriting based on the generated query tagger data;
performing a search of a database using the annotated query;
returning results of the search in response to the receiving of the raw query for presentation in a user interface.

8. The method of claim 7, wherein the generating of the profile lexicon includes a calculating a probability that an n-gram of the query corresponds to one of a set of candidate tags based on a distribution of the n-gram across fields included in the raw user profiles, the fields being mapped to a set of entities corresponding to the set of candidate tags.

9. The method of claim 8, wherein the set of entities include at least two of company name, first name, last name, geolocation, school name, skill, or title.

10. The method of claim 7, wherein the rewriting of the raw query includes tagging each n-gram in the query with one of a set of candidate tags corresponding to a set of entities based on the query tagger data.

11. The method of claim 10, wherein the rewriting of the raw query includes specifying confidence levels associated with the set of candidate tags, the confidence levels based on the query tagging data.

12. The method of claim 7, wherein the machine-learning model is a semi-conditional random field model that operates at a segment level in addition to an n-gram or token level.

13. A non-transitory machine-readable storage medium embodying instructions that, when executed by one or more processors, cause the one or more processors to perform operations comprising:
generating a click-through lexicon from a raw query log, wherein the generating of the click-through lexicon includes calculating a probability that an n-gram of the query corresponds to one of a set of candidate tags to be included in the annotated query, the probability based on a percentage of clicks by users of search results corresponding to user profiles in which the n-gram is specified in a field corresponding to the one of the set of candidate tags;
training a machine-learning model for entity prediction using selected data;
generating query tagger data using a profile lexicon, the click-through lexicon, and the machine-learning model;
receiving a raw query;
rewriting the raw query as an annotated query, the rewriting based on the generated query tagger data;
performing a search of a database using the annotated query;
returning results of the search in response to the receiving of the raw query for presentation in a user interface.

14. The non-transitory machine-readable storage medium of claim 13, wherein the generating of the profile lexicon includes a calculating a probability that an n-gram of the query corresponds to one of a set of candidate tags based on a distribution of the n-gram across fields included in the raw user profiles, the fields being mapped to a set of entities corresponding to the set of candidate tags.

15. The non-transitory machine-readable storage medium of claim 14, wherein the set of entities include at least two of company name, first name, last name, geolocation, school name, skill, or title.

16. The non-transitory machine-readable storage medium of claim 13, wherein the rewriting of the raw query includes tagging each n-gram in the query with one of a set of candidate tags corresponding to a set of entities based on the query tagger data.

17. The non-transitory machine-readable storage medium of claim 16, wherein the rewriting of the raw query includes specifying confidence levels associated with the set of candidate tags, the confidence levels based on the query tagging data.

* * * * *